United States Patent [19]

Hecker et al.

[11] Patent Number: 4,724,480
[45] Date of Patent: Feb. 9, 1988

[54] METHOD FOR OPTICAL ALIGNMENT OF ONE OBJECT WITH RESPECT TO ANOTHER

[75] Inventors: Joel Hecker, Port Jefferson Station; Robert Rongo, Kings Park, both of N.Y.

[73] Assignee: Robotic Vision Systems, Inc., Hauppauge, N.Y.

[21] Appl. No.: 729,760

[22] Filed: May 2, 1985

[51] Int. Cl.$^4$ .............................................. H04N 7/18
[52] U.S. Cl. ...................... 358/101; 358/107; 356/375; 901/47
[58] Field of Search ............... 358/101, 107; 901/3, 901/9, 45, 47; 356/375, 391, 1, 376; 364/559

[56] References Cited

U.S. PATENT DOCUMENTS

| | | | |
|---|---|---|---|
| 3,885,872 | 5/1975 | Howe, Jr. et al. | 356/1 |
| 4,185,918 | 1/1980 | DiMatteo et al. | 356/375 |
| 4,396,945 | 8/1983 | DiMatteo et al. | 358/107 |
| 4,491,719 | 1/1985 | Corby, Jr. | 901/9 |
| 4,529,316 | 7/1985 | DiMatteo | 356/1 |
| 4,575,304 | 3/1986 | Nakagawa et al. | 901/47 |

Primary Examiner—Howard W. Britton
Assistant Examiner—John K. Peng
Attorney, Agent, or Firm—Max Fogiel

[57] ABSTRACT

An arrangement for aligning a first object relative to a second object, in which a light pattern is projected from the first object onto the second object. An image of the pattern on the second object is recorded with a camera mounted on the first object. From the camera image it is possible to determine the relative position and orientation of the second object relative to the first object. In an alternate arrangement, a first light pattern is projected from the first object onto the second object, and a second light pattern is projected from the first object onto the second object, so that the second patten and the first pattern form a uniquely identifiable overlap pattern when the second object is in predetermined alignment with respect to the first object. From a camera image which has recorded the overlapping patterns, the position and orientation of the second object may be determined relative to the first object.

6 Claims, 10 Drawing Figures

METHOD FOR OPTICAL ALIGNMENT OF ONE OBJECT WITH RESPECT TO ANOTHER

BACKGROUND OF THE INVENTION

The present invention relates to an optical alignment tool which can replace the mechanical alignment tools presently being used during the robot teaching process. The optical alignment tool (sensor) consists of a light projector and camera which can be mounted on the robot end effector.

A circular pattern of light, when projected at an angle with respect to a camera axis, which intersects a flat surface, appears as an ellipse to the camera. Since the projected circle radius as well as camera/projector angles are known, the ellipse major and minor axes are known for any given surface angle relative to the sensor. When viewed on a monitor the ellipse dimensions may be used to indicate orientation of the robot end effector with respect to the object. The distortion may be used by an operator to position the sensor orientation during the robot teaching process. In addition, the center of the ellipse may be used to position the sensor in the depth direction.

As an aid to the operator, the desired ellipse may be digitally stored in the processor associated with the sensor and combined with the incoming camera signal. This results in a monitor display of the stored pattern and the teaching pattern. The operator then positions the sensor to match patterns.

It may also be possible to project an elliptical pattern which will appear, on the monitor, as a circle and may be easier to use during the teaching process.

This technique may also be used for focusing optical systems on a particular feature of a workpiece, for identifying and entering feature data as well as feature range location.

An alternate technique uses a single camera and two projectors. If the two projected patterns are identical then, in a manner similar to that previously described, the camera sees overlapping patterns when range and orientation are correct. The two projected patterns can be individually identified by turning one on and off or by making one dotted or discontinuous. In this manner the relative position in range, whether the objects are too close or too far apart, may be determined by the viewed pattern positions.

The two projected patterns can be different to aid alignment. If a cross and circular pattern are projected, then the relative location of the cross with respect to the circle, as seen by the camera, indicates in which direction, in or out, to move to get the desired standoff distance. The correct standoff is achieved when the cross is centered in the circle. Alternate projected patterns can be similarly used.

This technique may be applied to optically position one device with respect to another.

SUMMARY OF THE INVENTION

An arrangement for aligning a first object relative to a second object, in which a light pattern is projected from the first object onto the second object. An image is recorded with recording means in a recording step of the pattern on the second object with a camera mounted on the first object. The position and orientation of the second object relative to the first object are then determined from the camera image.

In another embodiment, a first light pattern is projected from the first object onto the second object, and a second light pattern is projected from the first object onto the second object. The arrangement is such that the second pattern and the first pattern form a uniquely identifiable overlap pattern when the second object is in predetermined alignment with respect to the first object. An image of the overlapping patterns is then recorded with a camera. The position and orientation of the second object relative to the first object are determined thereafter from the camera image.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

A technique for an optical alignment tool for a dual camera sensor is described in the following. Note that the purpose of the alignment tool (sensor) is to position the sensor such that its volumetric center is at a predetermined distance from a surface and that its coordinate system is perpendicular or other defined orientation with respect to the surface. With the use of the described optical method a user can readily achieve this purpose without touching or being near the sensor/workpiece. The sensor can be mounted on a structure such as a robot arm and enable the accurate positioning of the robot arm relative to a surface, or obtain measurements of points or features on the surface.

Figure 1:
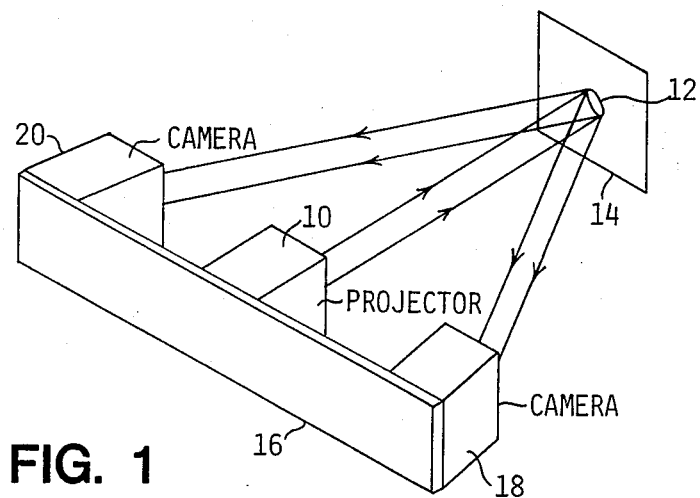
FIG. 1 is a schematic view in which a light source projects a circle onto a reference target surface parallel to the sensor reference plate, and two cameras are aligned, according to the present invention.
Figure 2:
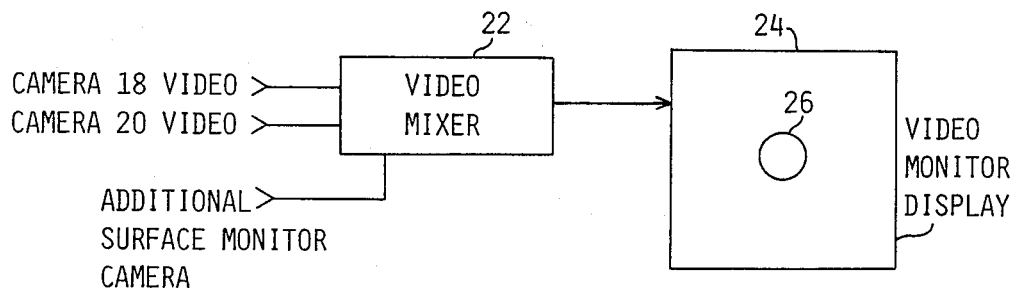
FIG. 2 is a schematic view and shows the arrangement for combining the outputs of the two cameras in FIG. 1.
Figure 3A:
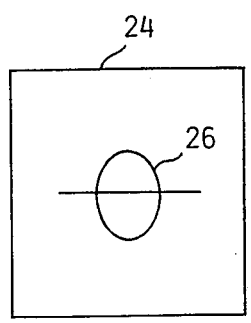
FIGS. 3a-3d are schematic views of a monitor display in FIG. 2 on which elliptical images are displayed, according to the present invention.

When the sensor is initially aligned, the light source 10 should project the circle 12 onto a reference target surface 14 which is parallel to the sensor reference plate 16 as shown in FIG. 1. The two cameras 18, 20 are then aligned and their output combined in mixer 22 (see FIG. 2) such that the resulting elliptical images 26 as seen on the monitor 24 are centered and as completely overlapped as possible as shown in FIG. 3a. This alignment establishes volumetric centering and perpendicularity, and may be used to measure object feature range.

Figure 3B:
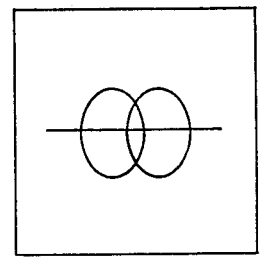
Figure 3C:
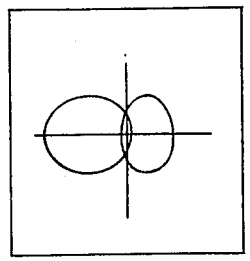
Figure 3D:
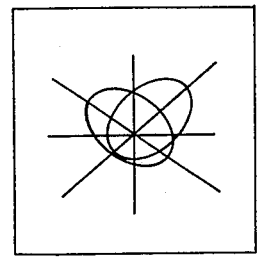
Figure 4:
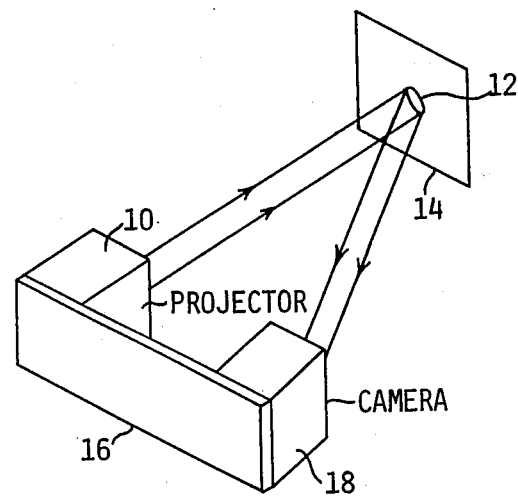
FIG. 4 is a schematic view of another embodiment in which only one camera and one projector are used to accomplish the task of aligning to a surface.
Figure 5:
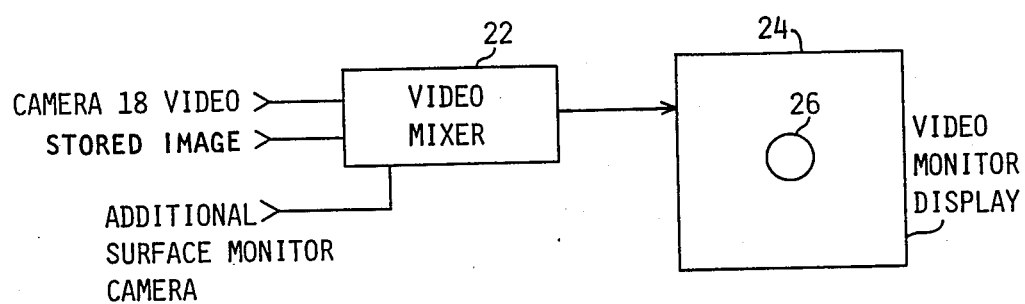
FIG. 5 is a schematic view corresponding to the embodiment of FIG. 4 and shows the arrangement for combining the camera output with the stored image.
Figure 6:
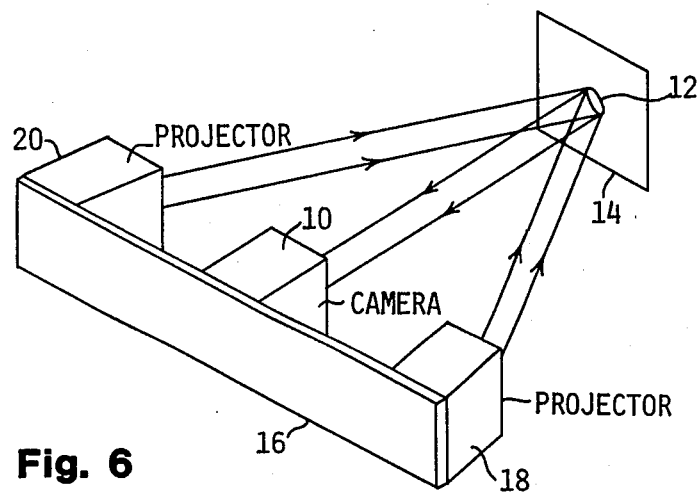
FIG. 6 is another embodiment of FIG. 1 in which one camera and two projectors are used.
Figure 7:
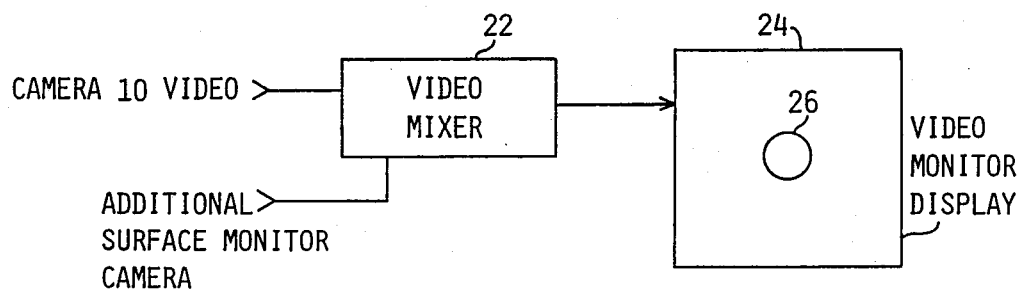
FIG. 7 is a schematic view corresponding to the embodiment of FIG. 6.

A change in the surface depth, from volume center, will result in the two images moving away from each other in the monitor's horizontal axis (see FIG. 3b). A change in the surface yaw (rotation about the vertical axis) will result in one image becoming increasingly elongated and the other becoming decreasingly elongated in the monitor's horizontal axis (see FIG. 3c). A change in surface pitch will result in the following changes in the observed images. Both images will become increasingly more elliptically elongated while at the same time their major axes will rotate from the monitor's horizontal axis toward the vertical axis. However the direction of rotation for each image will be opposite (see FIG. 3d).

Since the result described depends on the stereoscopic view of the two cameras 18 and 20, the projector 10 can be mounted separate from the cameras with similar results. The received images of the projected pattern 12 by cameras 18 and 20 will only overlap totally when surface 14 is at the desired distance and orientation relative to the cameras. The practical limitations of lens distortion may preclude perfect overlap, however, such deviations can be noted during calibration and taken into account when using the device.

A dual of the described system can also provide similar results. Let cameras 18 and 20 be replaced by light pattern projectors in a second arrangement. Their patterns 12 will overlap on surface 14 and come into complete overlap, within the limits of practicality, at only one distance of surface 14 relative to projectors 18 and 20. Thus a camera replacing projector 10 of the first arrangement will image the overlapping patterns and enable an operator observing monitor 24 to determine when the projectors 18 and 20 are at the correct distance and orientation relative to surface 14. Camera 10 need not be mounted on the same structure as projectors 18 and 20 in this second arrangement.

Further, if in this second arrangement, visible light is projected by projectors 18 and 20, then no camera is needed. The person can directly observe the resultant pattern overlap and determine the adjustments needed in distance and orientation to bring projectors 18 and 20 to the desired location relative to surface 14.

In measurement sensors based on optical triangulation, light is projected and a camera images the intersection of the projected light rays (e.g., U.S. Pat. No. 4,185,918). By using two projectors 18 and 20 as described above under the second arrangement two benefits can be derived. First, the person trying to place the sensor a known distance from a surface can view the projected patterns on the surface and adjust the sensor position until the two patterns converge into a single pattern. Second, the light, coming from two directions, provides greater coverage.

It is further possible to use just one camera and one projector to accomplish the task of aligning to a surface. If projector 10 projects a pattern 12 on surface 14 and camera 18 images pattern 12 on its light sensitive surface, then that image can be stored and used at a later time for comparison to the image received at that time. Thus a calibrated image can be stored and used to replace the image obtained from camera 20 in the arrangement previously described. The image from camera 18 will only exactly match the stored image when surface 14 is at the correct distance and orientation.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for aligning a first object relative to a second object comprising the steps of: projecting a non-planar light pattern from said first object onto said second object; recording an image of said pattern on said second object with a camera mounted on said first object; and determining from said camera image the position and orientation of said second object relative to said first object.

2. A method for aligning a first object relative to a second object comprising the steps of: projecting a first light pattern from said first object onto said second object; projecting a second light pattern from said first object onto said second object such that said second pattern and said first pattern form a uniquely identifiable overlap pattern when said second object is in predetermined alignment with respect to said first object; recording an image of said overlapping patterns with a camera; and determining from said camera image the position and orientation of said second object relative to said first object.

3. Apparatus for aligning a first object relative to a second object comprising: means for projecting a non-planar light pattern from said first object onto said second object; a camera mounted on said first object; means for recording an image of said pattern on said second object with said camera mounted on said first object; and means for determining from said camera image the position and orientation of said second object relative to said first object.

4. Apparatus for aligning a first object relative to a second object comprising: means for projecting a first light pattern from said first object onto said second object; means for projecting a second light pattern from said first object onto said second object such that said second pattern and said first pattern form a uniquely identifiable overlap pattern when said second object is in predetermined alignment with respect to said first object; a camera; means for recording an image of said overlapping patterns with said camera; and means for determining from said camera image the position and orientation of said second object relative to said first object.

5. A method for aligning a first object relative to a second object comprising the steps of: projecting a non-planar light pattern from said first object onto said second object; recording a first image of said pattern on said second object with a first camera mounted on said first object; recording a second image of said pattern on said second object with a second camera mounted on said first object; and determining from the comparison of said first and second images the position and orientation corrections required to align said first object relative to said second object at a predetermined distance and orientation.

6. Apparatus for aligning a first object relative to a second object comprising: means for projecting a non-planar light pattern from said first object onto said second object; means for recording a first image of said pattern on said second object with a first camera mounted on said first object; means for recording a second image of said pattern on said second object with a second camera mounted on said first object; and means for determining from the comparison of said first and second images the position and orientation corrections required to align said first object relative to said second object at a predetermined distance and orientation.

* * * * *